(12) United States Patent
Gut et al.

(10) Patent No.: US 12,544,825 B2
(45) Date of Patent: Feb. 10, 2026

(54) METHOD AND DEVICE FOR UNTWISTING AND SMOOTHING A CABLE END OF A TWISTED CABLE

(71) Applicant: komax Holding AG, Dierikon (CH)

(72) Inventors: Daniel Gut, Weggis (CH); Andras Losonczy, Meierskappel (CH)

(73) Assignee: komax Holding AG, Dierikon (CH)

( * ) Notice: Subject to any disclaimer, the term of this patent is extended or adjusted under 35 U.S.C. 154(b) by 328 days.

(21) Appl. No.: 18/202,069

(22) Filed: May 25, 2023

(65) Prior Publication Data
US 2023/0398596 A1 Dec. 14, 2023

(30) Foreign Application Priority Data
Jun. 10, 2022 (EP) .................................... 22178361

(51) Int. Cl.
*B21F 1/02* (2006.01)
*H02G 1/12* (2006.01)

(52) U.S. Cl.
CPC ........... *B21F 1/023* (2013.01); *H02G 1/1292* (2013.01)

(58) Field of Classification Search
CPC .... H01R 43/28; H01R 43/0335; H01R 42/30; H02G 1/1292; H02G 1/1248; B21F 1/023; B21F 1/02
See application file for complete search history.

(56) References Cited

U.S. PATENT DOCUMENTS

| | | | |
|---|---|---|---|
| 3,748,932 A * | 7/1973 | Neiman | H02G 1/1248 |
| | | | 81/9.51 |
| 9,368,259 B2 * | 6/2016 | Furuhata | H01B 13/0167 |
| 10,056,744 B2 * | 8/2018 | Hanna | D07B 7/18 |
| 2019/0103737 A1 | 4/2019 | Weaver | |

FOREIGN PATENT DOCUMENTS

| | | |
|---|---|---|
| DE | 32 24 840 A1 | 1/1984 |
| DE | 44 17 834 A1 | 11/1995 |
| DE | 195 28 430 C1 | 8/1996 |
| EP | 3 886 273 A1 | 9/2021 |

OTHER PUBLICATIONS

European Search Report dated Nov. 23, 2022 in European Application No. 22178361.6, with English translation of the relevant parts.

* cited by examiner

*Primary Examiner* — Teresa M Ekiert
(74) *Attorney, Agent, or Firm* — Collard & Roe, P.C.

(57) ABSTRACT

A method and a device untwists and smooths a cable end of a cable formed from single lines twisted in a twisting direction, using the device. The device includes an untwisting gripper having first and second untwisting jaws; a clamping gripper upwards of the untwisting gripper in the cable run having first and second clamping plates; and a cable gripper upwards of the clamping gripper. The method includes gripping the cable using the cable gripper; introducing the cable end between the open clamping gripper plates and the open untwisting gripper jaws; closing the plates and jaws; rotating the untwisting gripper counter to the twisting direction for untwisting the cable end; opening the jaws, reducing the jaws-plates distance and closing the plates; and smoothing the cable end by enlarging the distance between cable gripper and clamping gripper when the (Continued)

cable is clamped and simultaneously performing oscillating rotational untwisting gripper movements.

20 Claims, 2 Drawing Sheets

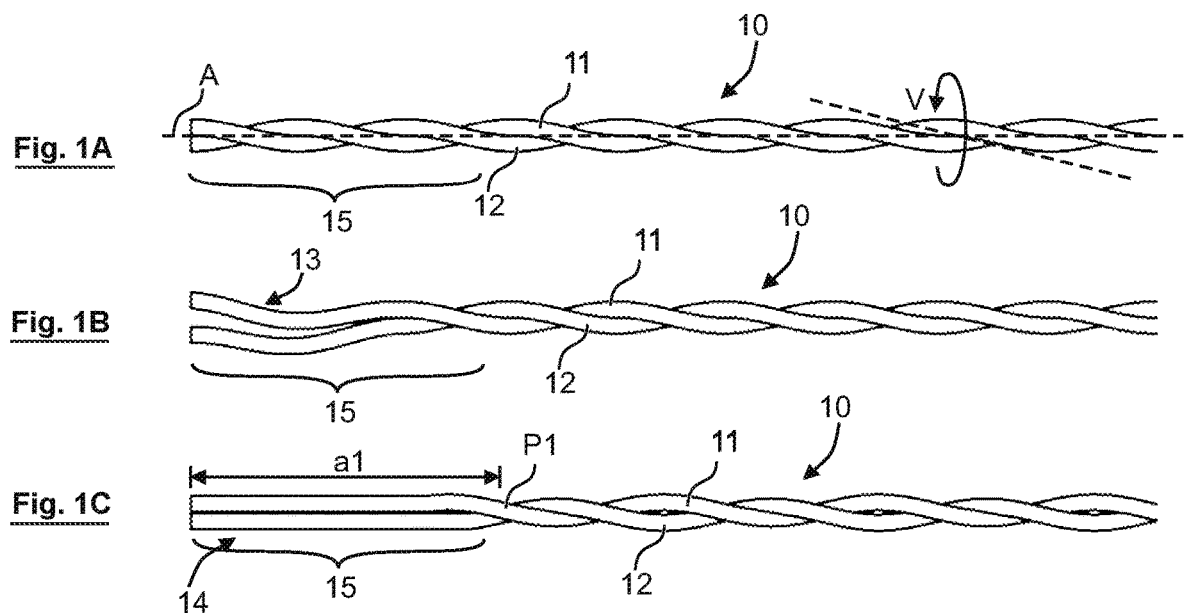
Fig. 1A
Fig. 1B
Fig. 1C
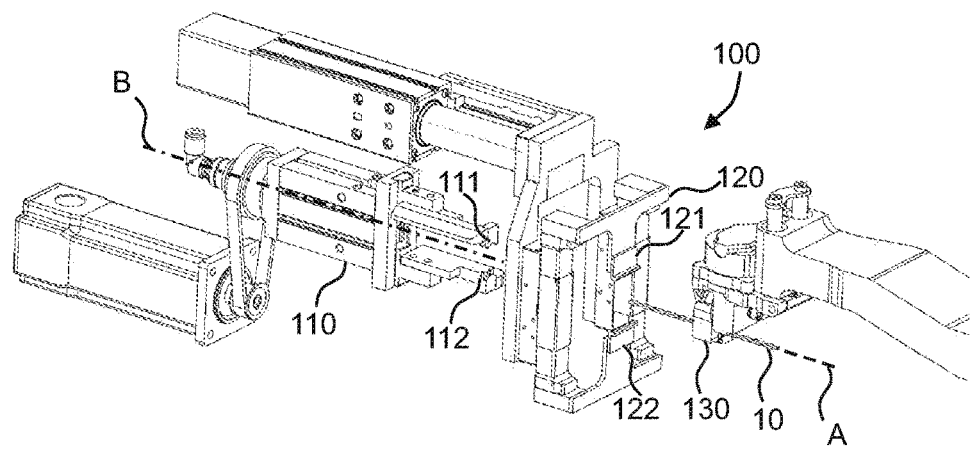
Fig. 2

METHOD AND DEVICE FOR UNTWISTING AND SMOOTHING A CABLE END OF A TWISTED CABLE

CROSS REFERENCE TO RELATED APPLICATIONS

Applicant claims priority under 35 U.S.C. § 119 of European Application No. 22178361.6 filed Jun. 10, 2022, the disclosure of which is incorporated by reference.

BACKGROUND OF THE INVENTION

1. Field of the Invention

The present disclosure relates to a method and a device for untwisting and smoothing a cable end of a twisted cable.

2. Description of the Related Art

Twisted cables are formed from single lines which are wound around one another in a twisting direction, i.e. twisted. Due to the twisting, the signal transmission characteristics of the cable are improved considerably.

It is sometimes desirable to untwist an end region of the cable, i.e. a cable end. During untwisting, as used here, a state should be produced, in which the single lines run substantially parallel to one another, by undoing the mutual winding of the single lines in the delimited region of the cable end.

Untwisting may e.g. be desirable, if during the production of a twisted cable, the single lines are not twisted after manufacturing, but rather already twisted starting material is used for manufacturing. Manufacturing typically comprises the single lines being cut to length, stripped and/or provided with contacts, grommets etc., at least at one of the ends thereof. Occasionally, manufacturing requires a neatly smoothed cable end.

Untwisting is particularly difficult if the single lines have a comparatively small line cross section. For example, in the case of single lines with a small line cross section, certain alloys, such as e.g. copper alloys, are used, the material characteristics of which require a particularly careful untwisting.

A device and a method for straightening conductor wire ends is known from DE 44 17 834 A1. The device comprises a base plate and a straightening plate, which lies on the base plate. The plates are moved towards one another during straightening, specifically in such a manner that one of the two plates is pulled off approximately parallel in the direction of the conductor wire end and at the same time, an oscillating back and forth movement of the plate is executed approximately transversely to a pull-off direction of the cable.

Problems to be Solved Using the Disclosure

The known method and the known device lead to a cable end with a comparatively high residual unevenness, i.e. the cable end obtained is not sufficiently neatly smoothed for subsequent manufacturing. In addition, the known method and the known device are not suitable for carrying out a reliable untwisting in the case of a cable made from single lines with a comparatively small line cross section.

SUMMARY OF THE INVENTION

It is an object of the present disclosure to specify a device or a method for untwisting and smoothing a cable end of a twisted cable, using which a reliable smoothing is achieved using simple, space-saving means.

Solution of the Problems

According to the present disclosure, a method according to one aspect of the invention or a device according to another aspect of the invention are specified.

According to one aspect, a device comprises an untwisting gripper, a clamping gripper and a cable gripper. The untwisting gripper comprises a first untwisting jaw and a second untwisting jaw, wherein the first and second untwisting jaws can be moved towards one another (i.e. can be closed) to hold a cable which is introduced and can be moved away from one another (i.e. can be opened) to release or unclamp a cable which is introduced. The cable which is introduced is formed from a plurality of single lines. The single lines are twisted in a twisting direction about a cable longitudinal axis, or cable axis for short. The clamping gripper comprises a first clamping plate and a second clamping plate, wherein the first and second clamping plates can be moved towards one another (i.e. can be closed) to clamp a cable which is introduced and can be moved away from one another (i.e. can be opened) to release or unclamp a cable which is introduced. The clamping gripper is arranged upwards of the untwisting gripper in the cable run of a cable introduced into the device. The cable gripper is arranged upwards of the clamping gripper in the cable run. According to the method, the cable is gripped using the cable gripper, particularly automatically. The cable end is introduced between the open clamping jaws and the open untwisting jaws, particularly by means of automatic pivoting and/or automatic travelling. The clamping plates and the untwisting jaws are closed. The untwisting gripper is rotated in the untwisting direction, counter to the twisting direction of the single lines of the cable, so that the cable end is untwisted. The untwisting jaws are opened. The distance of the untwisting jaws from the clamping plates along the cable axis is reduced. The untwisting jaws are closed again. A smoothing process of the cable end is carried out to smooth the cable end. The smoothing process comprises simultaneously executed steps, specifically an enlargement of the distance between cable gripper and clamping gripper with the cable clamped and performance of oscillating rotational movements of the untwisting gripper.

In one example, an oscillating rotational movement comprises a rotation of the untwisting gripper by a first angular value in a first direction of rotation, i.e. either in the clockwise direction or in the anticlockwise direction, a subsequent rotation of the untwisting gripper by a second angular value in a second direction of rotation, which is opposite to the first direction of rotation, i.e. depending on the direction of the first rotational movement, either in the anticlockwise direction or in the clockwise direction, and a subsequent rotation by a third angular value in the first direction of rotation. The first angular value may for example be approximately equal to the third angular value. The second angular value may for example be approximately double the first angular value. Then, an oscillating rotational movement according to this example is completed.

In a further example, an oscillating rotational movement comprises a rotation of the untwisting gripper by a first angular value in a first direction of rotation, i.e. either in the clockwise direction or in the anticlockwise direction, a subsequent rotation of the untwisting gripper by a second angular value in a second direction of rotation, which is opposite to the first direction of rotation, i.e. depending on the direction of the first rotational movement, either in the anticlockwise direction or in the clockwise direction. The first angular value may be approximately equal to the second angular value. Then, an oscillating rotational movement according to this example is completed.

In another further example, an oscillating rotational movement comprises a rotation of the untwisting gripper by undetermined, for example random values in a first direction of rotation, i.e. either in the clockwise direction or in the anticlockwise direction, and in a second direction of rotation, i.e. depending on the direction of the first rotational movement, either in the anticlockwise direction or in the clockwise direction. An oscillating rotational movement according to this example is completed, if from starting from an initial position of the untwisting gripper at the start of the smoothing process, the untwisting gripper has once passed and subsequently again reached the initial position, after rotating in the first direction of rotation and in the second direction of rotation.

During the smoothing process, the cable end is accordingly pulled substantially over its entire length through the closed untwisting jaws and the closed clamping jaws. Meanwhile, the oscillating rotational movements are executed by means of the untwisting gripper, which movements are transmitted to the conductors. As a result, the residual unevenness at the cable end is reduced, and the single lines run substantially parallel at the cable end.

Developments are specified below.

In embodiments, the oscillating rotational movements of the untwisting gripper are carried out alternately in the twisting direction and untwisting direction.

In embodiments, the oscillating rotational movements are carried out in the twisting direction and in the untwisting direction, respectively with less than one revolution of the untwisting gripper being carried out, preferably with less than one three quarter revolution or less than one half revolution.

In embodiments, the rotation of the untwisting gripper is continued in an untwisting direction counter to the twisting direction for untwisting the cable end beyond a complete untwisting of the single lines of the cable end, particularly by more than one half revolution of the untwisting gripper or by more than one revolution of the untwisting gripper. Such an over-untwisting can be adapted to the elasticity of the single lines. For example, in the case of particularly elastic single lines, which have a comparatively large shape memory, over-untwisting can be carried out. During the over-untwisting, a reverse rotation can take place by the excessive angular value, in order to complement the untwisting.

In embodiments, the closing force of the clamping plates is reduced prior to the smoothing process. Alternatively or additionally, preferably additionally, the closing force of the untwisting jaws is reduced prior to the smoothing process. The closing force is the force with which the clamping plates or the untwisting jaws act on the cable end. The respective clamping force is reduced in relation to the processes which precede the smoothing process. In particular, the respective closing force can be reduced such that damage to insulation, which respectively surrounds the single lines, is prevented, when in the course of the smoothing process, the clamped cable is pulled through the untwisting jaws and the clamping plates.

In embodiments, during the smoothing process, at least three completed oscillating rotational movements are performed, e.g. three pivoting movements of the untwisting gripper to and fro. In particular, more than five or more than ten completed oscillating rotational movements are carried out.

In embodiments, prior to the smoothing process, at least one parameter is specified, which is selected from the following group: speed during the enlargement of the distance between cable gripper and clamping gripper; oscillation speed during the performance of the oscillating rotational movement; oscillation angle during the performance of the oscillating rotational movement. In particular, the parameter is specified automatically depending on the type of the introduced cable end, for example depending on the line cross section, the thickness of the insulation, the conductor material, the insulation material and/or the number of single lines.

In embodiments, the smoothing process is repeated, for example repeated once, twice or more than twice. In particular, to repeat the smoothing process, the clamping plates and the untwisting jaws are opened; the distance between cable gripper and clamping gripper is reduced; the clamping plates and the untwisting jaws are closed; and a further smoothing process is carried out.

In embodiments, the untwisting gripper has a pneumatic untwisting parallel gripper, which carries the untwisting jaws. Alternatively or additionally, the clamping gripper has a pneumatic clamping parallel gripper, which carries the clamping plates. A pneumatic actuation option is particularly reliable and fast. In this context, it may be provided that the pneumatic untwisting parallel gripper and/or the pneumatic clamping parallel gripper in each case comprises a pressure control valve for specifying a clamping force. As a result, setting the clamping force to gently execute the smoothing process is possible in a particularly simple manner.

In embodiments, the untwisting gripper is designed for rotating about the cable axis in a specifiable, particularly programmable angle. As a result, a particularly simple configuration of the oscillating rotational movement is possible.

In embodiments, the clamping gripper is constructed to be displaceable in the cable direction, particularly displaceable in a programmable manner. As a result, it is possible in a simple manner to process cable with different lengths of the untwisted ends.

Programmable, as used here, designates a specification, particularly automatic specification, of the respective value for an automatic sequential control, which can be or is adapted to the conditions, for example the actual type and configuration of the cable end.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIGS. 1A, 1B, and 1C respectively show a twisted conductor pair for clarification of the terms used here;

FIG. 2 shows a perspective view of a device according to an embodiment;

DETAILED DESCRIPTION OF PREFERRED EMBODIMENTS

Figure 3:
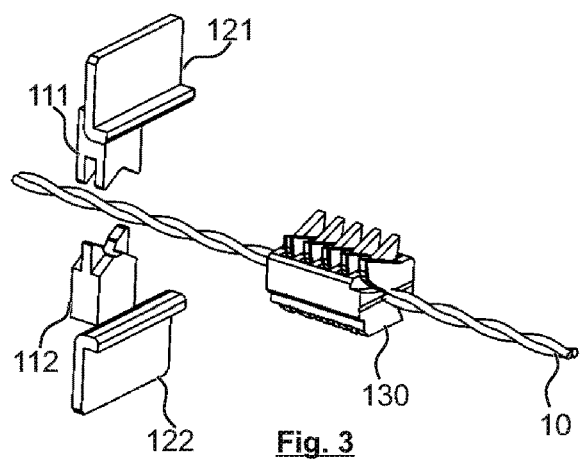
FIG. 3 shows perspective view of parts of the device from FIG. 2.

In the drawings, the same reference numbers designate the same or corresponding components.

FIG. 1A shows a twisted line pair made up of a first single line 11 and a second single line 12. The twisted line pair forms a cable 10. The first single line 11 is wound multiple times around the second single line 12, specifically along a twisting direction V, so that a twisted or stranded run is created along a cable longitudinal axis A (for short: cable axis A). The number of single lines in the example shown in FIG. 1A is two, but is not limited to two. More than two single lines, for example three, four or more lines, may also be twisted to form a cable. An end region of the cable 10, which is limited in terms of length along the cable axis A, is defined as cable end 15. Examples for the length of the cable end 15 along the cable axis A include a length in the range of maximum 10 cm and minimum 5 mm.

In certain use cases, it is sensible or necessary to again untwist the cable 10 made up of the twisted single lines 11, 12 at the cable end 15, i.e. to undo the wound or stranded structure of the single lines 11, 12 around the cable axis A. One possible reason is that the single lines 11, 12 in the region of the cable end 15 should be present as parallel to one another as possible and/or as parallel as possible to the cable axis A and/or as smoothly as possible, for example in order to execute a manufacturing process. A manufacturing process typically includes one or more of cutting to length, stripping and/or providing with contacts, grommets, etc.

For untwisting, the single lines 11, 12 are typically fixed at the cable-side termination of the cable end 15, for example clamped, and the single lines are rotated counter to the twisting direction V at the end-side termination of the cable 10 and consequently untwisted until the mutual winding of the single lines 11, 12 between the end-side termination of the cable 10 and the cable-side termination of the cable end is undone. If appropriate, the untwisting may be continued slightly, for example less than one revolution or less than two revolutions or less than three revolutions, beyond the point at which the mutual winding of the single lines 11, 12 between the end-side termination of the cable end 15 and the cable-side termination of the cable end 15 is undone (over-untwisting).

Following the untwisting or the over-untwisting in the case of a method and/or a device according to the prior art, a cable 10 is present according to FIG. 1B. The single lines 11, 12 at the cable end 15 have a non-parallel, non-smooth wave structure 13 in relation to one another and do not run parallel to the cable axis A.

In the case of a method and/or a device according to the present disclosure, a cable 10 is present according to FIG. 10, following the untwisting and a smoothing process. The single lines 10, 11 at the cable end 15 have a parallel smooth structure 14 in relation to one another and run substantially parallel to the cable axis A. The cable end 15 comprises for example a majority of a region of the length a1, which extends from the end-side termination of the cable 10 (in FIG. 1, the end of the cable 10 on the left side) to a first crossing point P1 of the single lines 11, 12. Majority designates for example more than 80%, typically more than 90% or more than 95% of the region of the length a1 from the end-side termination of the cable 10 to the first crossing point P1 of the single lines 11, 12.

FIG. 2 shows a perspective view of a device 100 according to an embodiment for carrying out a method described herein. The device 100 is for example part of a cable processing machine (not illustrated completely). The device 100 comprises a cable gripper 130, a clamping gripper 120 and an untwisting gripper 110.

The cable 10 is held by the cable gripper 130 and can be introduced into the clamping gripper 120 and the untwisting gripper 110 by means of actuators (not illustrated) in the direction of a processing axis B of the device 100. It is also conceivable that the cable gripper moves the cable held in the direction of the cable axis A linearly. It is also possible that the cable gripper is attached to a pivoting arm (not illustrated) or to a transfer system (not illustrated). It is also conceivable that the cable is introduced into the cable gripper by hand.

The clamping gripper 120 comprises two clamping plates 121, 122. The clamping plates 121, 122 can be moved towards one another and away from one another transversely to the cable axis A of a cable introduced into the device, that is to say generally also transversely to the processing axis B, in order to clamp the cable as required. Generally, the clamping plates 121, 122 are flush, i.e. are arranged substantially without an offset to one another along the processing axis B.

It is understood that the clamping gripper 120 is not limited to two clamping plates 121, 122 and that more than two clamping plates may also be provided.

The untwisting gripper 110 comprises two untwisting jaws 111, 112. The untwisting jaws 111, 112 can be moved towards one another and away from one another transversely to the cable axis A of a cable which is introduced into the device, that is to say generally also transversely to the processing axis B, in order to grip the cable as required. Generally, the untwisting jaws 111, 112 are flush, i.e. are arranged substantially without an offset to one another along the processing axis B.

It is understood that the untwisting gripper 110 is not limited to two untwisting jaws 111, 112 and that more than two untwisting jaws may also be provided.

In one example, the untwisting gripper is designed as a pneumatic parallel gripper. The closing force can be set for example by means of a pressure control valve (not illustrated).

The axis of rotation of the untwisting gripper 110 is flush with the processing axis B. The untwisting gripper 110 is rotatable about the axis of rotation, particularly rotatable automatically and typically rotatable by a specifiable or specified angle, specifically optionally in both directions of rotation (clockwise direction, anticlockwise direction when viewed from the cable end). The untwisting gripper 110 can for example be rotated with the aid of an electric drive illustrated in FIG. 2 about the processing axis B in both directions with a programmable angle in each case. Programmable, as used here, designates a specification, particularly automatic specification, of the respective value for an automatic sequential control, which can be or is adapted to the conditions, for example the actual type and configuration of the cable end 15.

The cable run designates the run of the cable from the end-side termination of the cable end 15. The cable gripper 120 is arranged upwards of the untwisting gripper 110 in the cable run. The cable gripper 130 is arranged upwards of the clamping gripper in the cable run. The clamping gripper 120 is consequently located between the untwisting gripper 110, which can clamp one region at the end-side termination of the cable end 15, and the cable gripper 130.

FIG. 3 shows a perspective view of parts of the device 100 from FIG. 2, namely the untwisting jaws 111, 112, the clamping plates 121, 122 and the cable gripper 130. Additionally, FIG. 3 also shows a clamped cable 10 made up of two single lines 11, 12. In the illustrated embodiment, the cable 10 is movable linearly in the direction of the cable axis A or the processing axis B; the untwisting gripper 110 is stationary; and the clamping gripper 120 is linearly movable at least in the direction of the cable axis A or the processing axis B. It is also conceivable that the cable 10 is not moved; the untwisting gripper 110 is linearly movable at least in the direction of the cable axis A or the processing axis B; and the clamping gripper 120 is linearly movable at least in the direction of the cable axis A or the processing axis B. The movements FIGS. 4 to 8 in each case show, in a side view of the parts from FIG. 3, the positional relationship of the parts in the method sequence of a method according to an embodiment.

Figure 4:
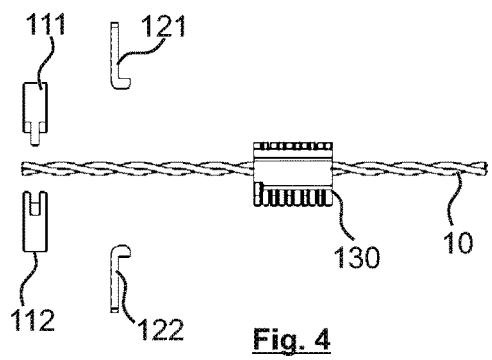
FIG. 4 shows a side view of the parts of the device from FIG. 2 in a method sequence according to an embodiment.

FIG. 4 shows an initial position. The cable 10, which is held by the cable gripper 130, is introduced into the device 100 and placed such that the clamping plates 121, 122 of the clamping gripper 120, which is orientated in the direction of the cable axis A and processing axis B, are at the end-side termination of the cable end 15 (the start of the cable section to be untwisted) and the untwisting jaws 111, 112 of the untwisting gripper 110 are located at the cable-side termination of the cable end 15. It may be provided that the cable 10 is orientated, i.e. rotated and/or linearly moved, prior to the identically described untwisting process, in order to clamp the cable 10 at the correct position and possibly with single lines 11, 12 which are already lying next to one another. For example, a camera and image analysis are used for this orientation.

Figure 5:
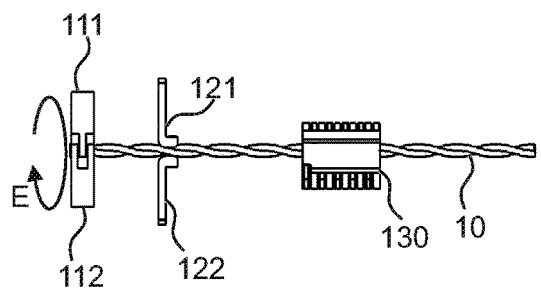
FIG. 5 shows a side view of the parts of the device from FIG. 2 in the method sequence.

FIG. 5 shows an initial position. After the clamping plates 121, 122 and the untwisting jaws 111, 112 are closed, the untwisting gripper 110 rotates counter to the twisting direction V of the cable 10 by a specified or specifiable angular value. The untwisting direction E is indicated with an arrow in FIG. 5. The angular value is generally specified such that the cable end 15 is completely untwisted. This angular value can for example be derived from the pitch of the twist (the distance from one crossing point to the next crossing point of the twisted lines of the same kind when viewed from the same direction or in the same plane) and the number of twists. Depending on the composition of the single lines 11, 12, for example the elasticity thereof, it may be appropriate to rotate somewhat beyond this angular value and reverse rotate again (over-untwisting).

Figure 6:
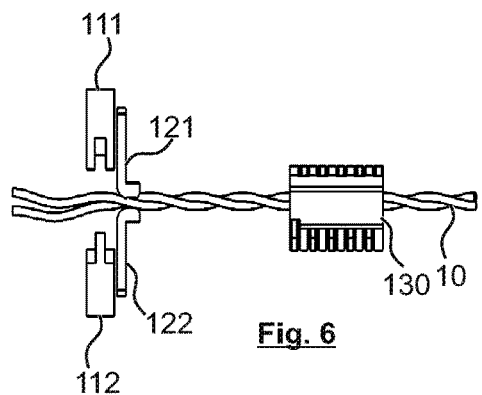
FIG. 6 shows a side view of the parts of the device from FIG. 2 in the method sequence.

FIG. 6 shows the preparation of a smoothing process following the untwisting process. The opened untwisting jaws 111, 112 travel to the clamping plates 121, 122 and are closed again.

Figure 7:
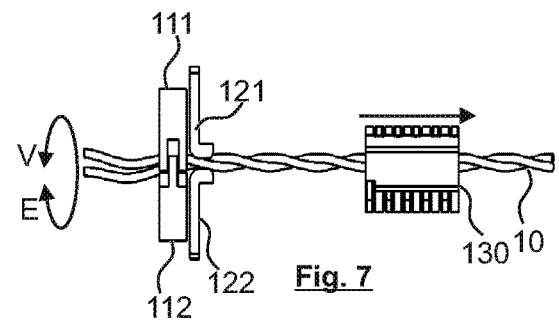
FIG. 7 shows a side view of the parts of the device from FIG. 2 in the method sequence.

FIG. 7 shows a smoothing process. The cable end 15 is pulled as a consequence of a longitudinal movement of the cable gripper 130, which is indicated by an arrow in FIG. 7, through the closed clamping plates 121, 122 and the closed untwisting jaws 111, 112. Typically, the cable end 15 is pulled substantially over the entire length a1 of the cable end 15 through the closed clamping plates 121, 122 and the closed untwisting jaws 111, 112. As mentioned above, it is however also possible that the cable end 15 stays still, whilst the clamping gripper 120 and the untwisting gripper 110 move, or that the untwisting gripper 110 pulls the cable through the closed clamping plates 121, 122. During this relative movement or longitudinal movement, the untwisting gripper 110 executes a plurality of oscillating rotational movements or pivots about the cable axis A using the untwisting jaws 111, 112, which are closed around the single lines 11, 12 at the cable end 15, i.e. alternately (oscillating) in the twisting direction V and in the untwisting direction E, as shown with the double arrow in FIG. 7.

A speed of the longitudinal movement and/or a pivoting speed of the untwisting gripper 110 and/or a pivot angle of the untwisting gripper 110 can be specified, for example as a process parameter in a control device (not illustrated) of the device 100, which process parameter is or can be determined in advance, particularly determined depending on the characteristics of the cable. The process parameters can for example be determined, particularly saved, for each cable variant to be processed.

It is conceivable, prior to the smoothing process, to reduce the closing force of the clamping plates 121, 122 and/or the closing force of the untwisting jaws 111, 112. In particular, the respective closing force can be reduced such that damage to insulation (not illustrated), which respectively surrounds the single lines, is prevented, when in the course of the smoothing process, the clamped cable is pulled through the untwisting jaws and the clamping plates. However, the closing force is only reduced to the extent that the clamping plates 121, 122 or the untwisting jaws 111, 112 are still closed, that is to say act in a clamping manner on the cable 10.

Figure 8:
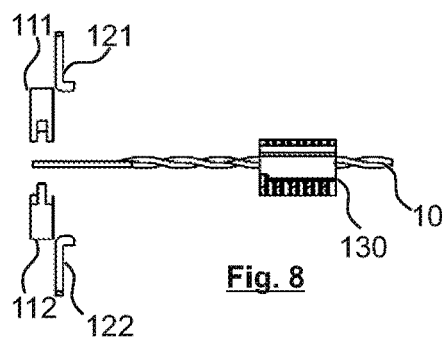
FIG. 8 shows a side view of the parts of the device from FIG. 2 in the method sequence.

FIG. 8 shows the completion of the smoothing process. The smoothing process is generally completed when the end-side termination of the cable end 15 reaches the untwisting gripper 110. Subsequently, the clamping plates 121, 122 and the untwisting jaws 111, 112 are opened and the cable 10 can be transported further or removed. It is also possible by means of corresponding displacement or movement of the cable 10, the clamping plates 121, 122 or the untwisting jaws 111, 112, to add one or more repetitions of the smoothing process.

It is understood that the above objects, features, configurations, etc. are exemplary and can be combined with one another in a fitting manner or partially omitted within the disclosure content of the present disclosure.

Thus, although only a few embodiments of the present invention have been shown and described, it is to be understood that many changes and modifications may be made thereunto without departing from the spirit and scope of the invention.

What is claimed is:

1. A method for untwisting and smoothing a cable end of a cable, which is formed from a plurality of single lines which are twisted in a twisting direction about a cable axis, by means of a device, wherein the method comprises:
providing the device; wherein the device includes an untwisting gripper having a first untwisting jaw and a second untwisting jaw; a clamping gripper, which is arranged upwards of the untwisting gripper in the cable run, having a first clamping plate and a second clamping plate; and a cable gripper, which is arranged upwards of the clamping gripper in the cable run,
gripping the cable using the cable gripper;
introducing the cable end between the open clamping plates of the clamping gripper and the open untwisting jaws of the untwisting gripper;
closing the clamping plates and the untwisting jaws;

rotating the untwisting gripper in an untwisting direction counter to the twisting direction for untwisting the cable end;

opening the untwisting jaws, reducing the distance of the untwisting jaws from the clamping plates along the cable axis and closing the untwisting jaws; and carrying out a smoothing process of the cable end by enlarging the distance between cable gripper and clamping gripper when the cable is clamped along the cable axis and at the same time performing oscillating rotational movements of the untwisting gripper.

2. The method according to claim 1, wherein the oscillating rotational movements of the untwisting gripper are carried out alternately in the twisting direction and untwisting direction.

3. The method according to claim 1, wherein the oscillating rotational movements are carried out in the twisting direction and in the untwisting direction, respectively with less than one revolution of the untwisting gripper (110) being carried out.

4. The method according to claim 1, wherein the rotation of the untwisting gripper is continued in an untwisting direction counter to the twisting direction for untwisting the cable end beyond a complete untwisting of the single lines of the cable end.

5. The method according to claim 1, further comprising: reducing a closing force of the clamping plates and/or reducing a closing force of the untwisting jaws prior to the smoothing process.

6. The method according to claim 1, wherein during the smoothing process, at least three oscillating rotational movements are performed.

7. The method according to claim 1, further comprising: prior to the smoothing process; specifying at least one parameter from a speed during the enlargement of the distance between cable gripper and clamping gripper, an oscillation speed when performing the oscillating rotational movements and an oscillation angle when performing the oscillating rotational movements.

8. The method according to claim 1, further comprising, after the smoothing process:
opening the clamping plates and the untwisting jaws;
reducing the distance between cable gripper and clamping gripper;
closing the clamping plates and the untwisting jaws; and
carrying out a further smoothing process of the cable end by enlarging the distance between cable gripper and clamping gripper when the cable is clamped and at the same time performing oscillating rotational movements of the untwisting gripper.

9. The method according to claim 1, wherein the oscillating rotational movements are carried out in the twisting direction and in the untwisting direction, respectively with less than one half revolution of the untwisting gripper being carried out.

10. The method according to claim 1, wherein the rotation of the untwisting gripper, is continued in an untwisting direction counter to the twisting direction for untwisting the cable end beyond a complete untwisting of the single lines of the cable end by more than one half revolution of the untwisting gripper.

11. The method according to claim 1, wherein during the smoothing process, at least five oscillating rotational movements are performed.

12. The method according to claim 1, wherein during the smoothing process, at least ten oscillating rotational movements are performed.

13. A device for untwisting and smoothing a cable end of a cable, which is formed from a plurality of single lines which are twisted in a twisting direction about a cable axis, the device comprising:
an untwisting gripper having a first untwisting jaw and a second untwisting jaw,
a clamping gripper, which is arranged upwards of the untwisting gripper in the cable run, having a first clamping plate and a second clamping plate, and
a cable gripper, which is arranged upwards of the clamping gripper in the cable run,
wherein the device is configured to grip the cable using the cable gripper; introduce the cable end between the open clamping plates of the clamping gripper and the open untwisting jaws of the untwisting gripper; close the clamping plates and the untwisting jaws; rotate the untwisting gripper in an untwisting direction counter to the twisting direction for untwisting the cable end; open the untwisting jaws, reduce the distance of the untwisting jaws from the clamping plates along the cable axis and close the untwisting jaws; and carry out a smoothing process of the cable end by enlarging the distance between cable gripper and clamping gripper when the cable is clamped along the cable axis and at the same time performing oscillating rotational movements of the untwisting gripper.

14. The device according to claim 13, wherein the untwisting gripper has a pneumatic untwisting parallel gripper, which carries the untwisting jaws.

15. The device according to claim 13, wherein the clamping gripper has a pneumatic clamping parallel gripper, which carries the clamping plates.

16. The device according to claim 14, wherein the pneumatic untwisting parallel gripper and/or the pneumatic clamping parallel gripper in each case comprises a pressure control valve for specifying a clamping force.

17. The device according to claim 13, wherein the untwisting gripper is rotatable about the cable axis in a specifiable angle.

18. The device according to claim 13, wherein the clamping gripper is displaceable in a cable longitudinal direction.

19. The device according to claim 13, wherein the untwisting gripper is rotatable about the cable axis in a programmable angle.

20. The device according to claim 13, wherein the clamping gripper is displaceable in a programmable manner in a cable longitudinal direction.

* * * * *